US009736462B2

(12) United States Patent
Weinstock (10) Patent No.: US 9,736,462 B2
(45) Date of Patent: Aug. 15, 2017

(54) THREE-DIMENSIONAL VIDEO PRODUCTION SYSTEM

(75) Inventor: Neal I. Weinstock, Brooklyn, NY (US)

(73) Assignee: SOLIDDD CORP., Brooklyn, NY (US)

( * ) Notice: Subject to any disclaimer, the term of this patent is extended or adjusted under 35 U.S.C. 154(b) by 0 days.

(21) Appl. No.: 12/901,477

(22) Filed: Oct. 8, 2010

(65) Prior Publication Data

US 2015/0015674 A1    Jan. 15, 2015

(51) Int. Cl.
*H04N 15/00* (2006.01)
*H04N 13/02* (2006.01)

(52) U.S. Cl.
CPC ..... *H04N 13/0242* (2013.01); *H04N 13/0296* (2013.01)

(58) Field of Classification Search
CPC ........... H04N 13/0242; H04N 13/0239; H04N 13/0048; H04N 13/0059; H04N 13/0404; H04N 13/0022; H04N 13/0246; H04N 2013/0081
USPC .......................................... 348/43, 48, 157
See application file for complete search history.

(56) References Cited

U.S. PATENT DOCUMENTS

| 5,850,352 | A  | * | 12/1998 | Moezzi et al. ................. 345/419 |
| 6,697,105 | B1 |   | 2/2004  | Kato et al. |
| 7,116,323 | B2 | * | 10/2006 | Kaye ....................... G06T 5/005 345/419 |
| 2004/0233275 | A1 | * | 11/2004 | Tomita ............................. 348/51 |
| 2005/0129325 | A1 | * | 6/2005 | Wu ................................. 382/254 |
| 2007/0279494 | A1 | * | 12/2007 | Aman ................... G01S 3/7864 348/169 |
| 2008/0080761 | A1 | * | 4/2008 | Hsien et al. ................... 382/154 |
| 2010/0208942 | A1 | * | 8/2010 | Porter ................ H04N 13/0207 382/106 |

OTHER PUBLICATIONS

International Search Report for Application PCT/US2014/052517, Jun. 7, 2015, 6 pages, European Patent Office, The Hague, Netherlands.

* cited by examiner

*Primary Examiner* — Jared Walker
(74) *Attorney, Agent, or Firm* — Ference & Associates LLC (57) ABSTRACT

A number of elements within a venue of a live-action event to be televised are tagged with wireless tracking devices to provide accurate and timely location information for all of the elements to facilitate direction of audiovisual capture devices such as cameras and microphones, to automatically regulate convergence, to automatically vertically align paired left- and right-eye views, and to synthesize part or all of 3D scenes when such are not otherwise available.

19 Claims, 4 Drawing Sheets

THREE-DIMENSIONAL VIDEO PRODUCTION SYSTEM

FIELD OF THE INVENTION

The present invention relates generally to video production systems, and, more particularly, to a video production system that controls operations of a number of spatially distributed audiovisual capture devices, such as cameras and microphones, to produce a single, integrated three-dimensional video product.

BACKGROUND OF THE INVENTION

Traditionally, television (TV) production has featured the use of at least three cameras, with the video produced by those cameras seen in a control room on a monitor for each camera and selectable through a video switcher. As used here, a signal received from an audio or video device is sometimes referred to as a "feed." A human director of a live TV program typically chooses camera views among these three or more feeds, while speaking into a microphone with wireless communication to the camera operators, to tell them how to position their cameras. Similarly, in live audio recording situations, many microphone feeds (i.e., audio signals received from the microphones), as well as direct electronic feeds from electronic instruments (e.g., electric guitars, keyboards, and such), go into a live audio mixer, and a front-of-house human engineer adjusts relative volumes and equalizations of the feeds to create a pleasing audio mix.

These processes have, in recent years, become far more difficult, most especially in the shooting and recording of live sporting events, as the number of camera positions has increased to a typical 18 or more per event; and microphone positions may number greater than 100. The director's job of controlling, among other things, proper positioning of cameras and/or microphones with virtually no information regarding their current positions aside from the feeds themselves and the verbal position reports given by human operators and with virtually no direct control of position aside from verbal instructions to the operators, is taxing to say the least. It is generous to say that the control available to the director is "loose".

The complexity of such systems is exacerbated by stereoscopic imaging, which now increasingly places yet greater demands on the director's and the audience's understanding of where action takes place within observable three-dimensional (3D) space. 3D broadcasts typically involve more cameras and more microphones than for conventional, two-dimensional broadcasts. So, the complexity of the director's task of operator control grows exponentially.

Beyond the complexity of more devices to control, 3D broadcasting poses additional challenges.

One such challenge is that of convergence. In 3D video viewing, each object can appear to be at a depth that is not at the surface of the video display. One of the challenges of 3D video production is the stability of an object's perceived depth from shot to shot. For example, without careful control, a stationary object in a 3D video can appear to move or even jump toward or from the viewer. The effect can be very distracting and annoying to the viewer, much like the perpetual zooming in and out by some amateur videographers. Convergence refers to the relative horizontal positioning of left- and right-eye images meant to be viewed simultaneously (or in rapid sequence, utilizing the phenomenon of persistence of vision, to seem simultaneous); proper alignment of convergence from shot to shot lends stability of the scene in terms of its depth, in what is generally referred to as the z-axis of the three-dimensional display. As used here, a shot is an uncut, uninterrupted video scene captured by a camera.

Conventionally, convergence is controlled by manually watching the video and manually adjusting separation of left and right views to maintain a relatively consistent perceived depth. Doing so in a live video production with numerous 3D video feeds is simply impractical, and yet that is what has been done in all conventional multi-camera 3D TV video production. Because of its impracticality, the number of camera positions possible to use in 3D video production has, thus far, been far smaller than those commonly used in 2D video production.

Another challenge posed by 3D video production is that of vertical alignment of left and right view cameras. The two cameras capturing left and right views for the left and right eyes of the viewer ought to be precisely aligned vertically, i.e., pointing at precisely the same elevation. However, even if the cameras and/or lenses are carefully aligned at the beginning of a shot, the left- and right-eye images can become misaligned during the shot.

In particular, the focal center of the camera's lens can move slightly off center as the elements of the lens move during zooming in and out. Accordingly, the line of sight of the camera can vary slightly in the vertical direction, sometimes significantly, particularly at high magnitudes of zoom. This can result in an object appearing to the human viewer as being slightly higher or lower in the left eye than in the right eye. This effect can be very distracting and annoying and even painful to the viewer.

A third challenge posted by 3D video production is the unavailability of a 3D view in some instances. In complex productions such as live sporting events, it may be impractical to equip the venue with 3D video setups throughout. Accordingly, some aspects of the production may only be available in two-dimensional, flat video. That 2D video will likely be shot in a different style than would be acceptable for 3D viewing, since audiences tend to like much less cutting from shot to shot, and longer length shots, in 3D than in 2D.

Conversely, because video producers need to create both 2D and 3D versions of the same events, and since different cutting styles will be typically wanted for the two versions, a fourth challenge in 3D shooting is that the common procedure of taking one of the 3D eye views as a 2D version results in less exciting content (for the 2D version alone) than could have been achieved if the 2D version were created separately.

SUMMARY OF THE INVENTION

In accordance with the present invention, a number of elements within a venue of a live-action event to be televised are tagged with wireless tracking devices to provide accurate and timely location information for all of the elements to facilitate direction of audiovisual capture devices such as cameras and microphones, to automatically regulate convergence, to automatically vertically align paired left- and right-eye views, and to synthesize part or all of 3D scenes when such are not otherwise available.

Tagging of cameras and microphones to provide accurate and timely location information of those cameras and microphones allows a human director or producer to immediately direct repositioning of such cameras and microphones. The locations of the cameras and microphones are represented in a graphical representation of the venue and other elements of the live-action event occurring therein such that the producer can immediately recognize and assess camera and microphone positions relative to the ongoing action. In addition, using simple and intuitive graphical user interface techniques, the producer can direct movement of a camera or microphone with a simple drag-and-drop user input gesture. The result is communication of an instruction to move to the new location specified by the drag-and-drop user input gesture to the camera or microphone—either to robotic controls thereof or to a human operator thereof.

With information regarding the location and orientation of a given camera and of elements located within the field of view of the camera allows estimation of the location of the element in the video feed received from the camera and quick recognition of the element therein. For vertical alignment between multiple views of a stereoscopic video feed, differences of elevation of the representation of the element within each view are automatically recognized and the various views are shifted vertically to automatically control vertical alignment between the multiple views. For convergence control, differences of horizontal position of the representation of the element within each view are automatically recognized. In addition, location information provides a distance of the element from the camera. Such information is used to determine a desired depth of projection of the element and the multiple views can be shifted horizontally to provide the desired depth of projection of the element.

Using the same element representation and distance information, 3D views can be synthesized from 2D feeds. In particular, additional views can be produced by horizontally shifting elements represented in a 2D feed to project those elements to appropriate depths in a 3D feed that includes the 2D feed and the additional views.

Using location information of a number of elements in the live-action event within the venue, views can be synthesized using computer video game techniques and 3D models and skins of the actual elements within the venue. The real-time location information and orientation information allows immediate synthesis of the live action from any perspective, regardless of camera positioning within the venue. Orientation information can be provided by tagging elements of the live-action, such as human players, with additional wireless tracking devices.

DETAILED DESCRIPTION OF THE INVENTION

In accordance with the present invention, a video production system 100 (FIG. 1) uses real-time position data of elements in a subject venue 104 to facilitate direction of audiovisual capture devices such as cameras and microphones, to automatically regulate convergence, to automatically correct for vertical misalignment between paired left- and right-eye views, and to synthesize part or all of 3D scenes when such are not otherwise available. Elements of the venue include audiovisual devices responsive to instructions of the human director, e.g., cameras 110A-D and microphones 112A-B, and subject elements of the event being recorded and broadcast from the venue 104, e.g., players 106A-B and ball 108.

Figure 1:
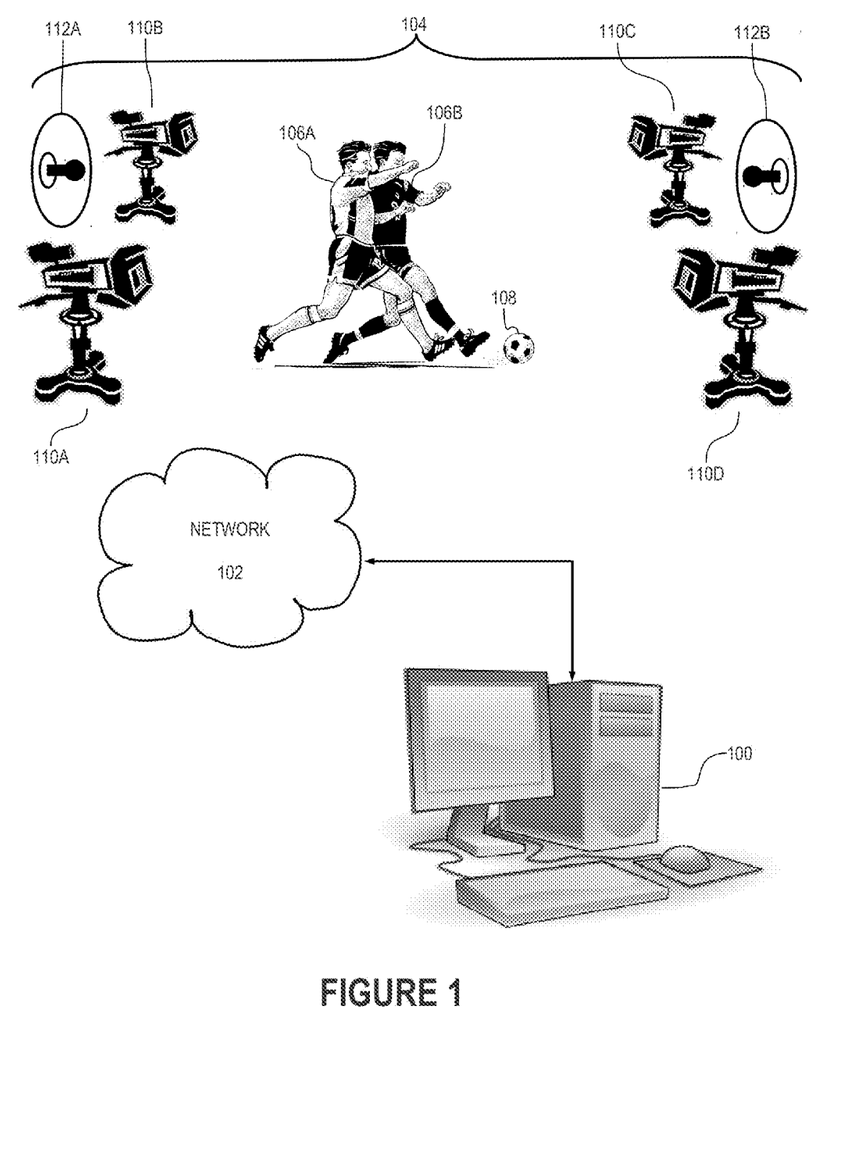
FIG. 1 is a diagram illustrating a venue in which a television broadcast is to be produced, including elements of the venue, a video production system in accordance with the present invention, and a network.

It should be appreciated that, while only four cameras and two microphones are shown in this illustrative embodiment, many more cameras and microphones can be managed by video production system 100 in the manner described herein. A particularly simple configuration is described herein to facilitate understanding and appreciation of video production system 100.

In this illustrative embodiment, the elements of venue 104 are tagged with wireless tracking devices, such as those used in the Ultra Wideband standard for example. Wireless tracking stations are installed in venue 104 to determine relatively precise locations of tagged elements in venue 104. The wireless tracking stations report these locations to video production system 100 through a network 102, which can be a local area network and connections thereto can be wired or wireless. Audiovisual devices responsive to instructions of the director are tagged with wireless tracking devices. Accordingly, video production system 100 knows the precise location of cameras 110A-D and microphones 112A-B in real time. In addition, numerous elements of the event transpiring in venue 104 are similarly tagged with wireless tracking devices such that video production system 100 knows the precise location of these elements in real time as well. In this illustrative embodiment, the event is a soccer game. It is preferred that all elements that can appear in the produced video whose depth is of concern are so tagged. Examples of such elements include the players (even those on the sidelines), the referees, the ball, the coaches, significant locations on the playing field, the goal posts, and a number of locations of the stadium itself, such as seating section boundaries for example. Various parts of a player's body might also be tagged for yet greater accuracy.

Figure 2:
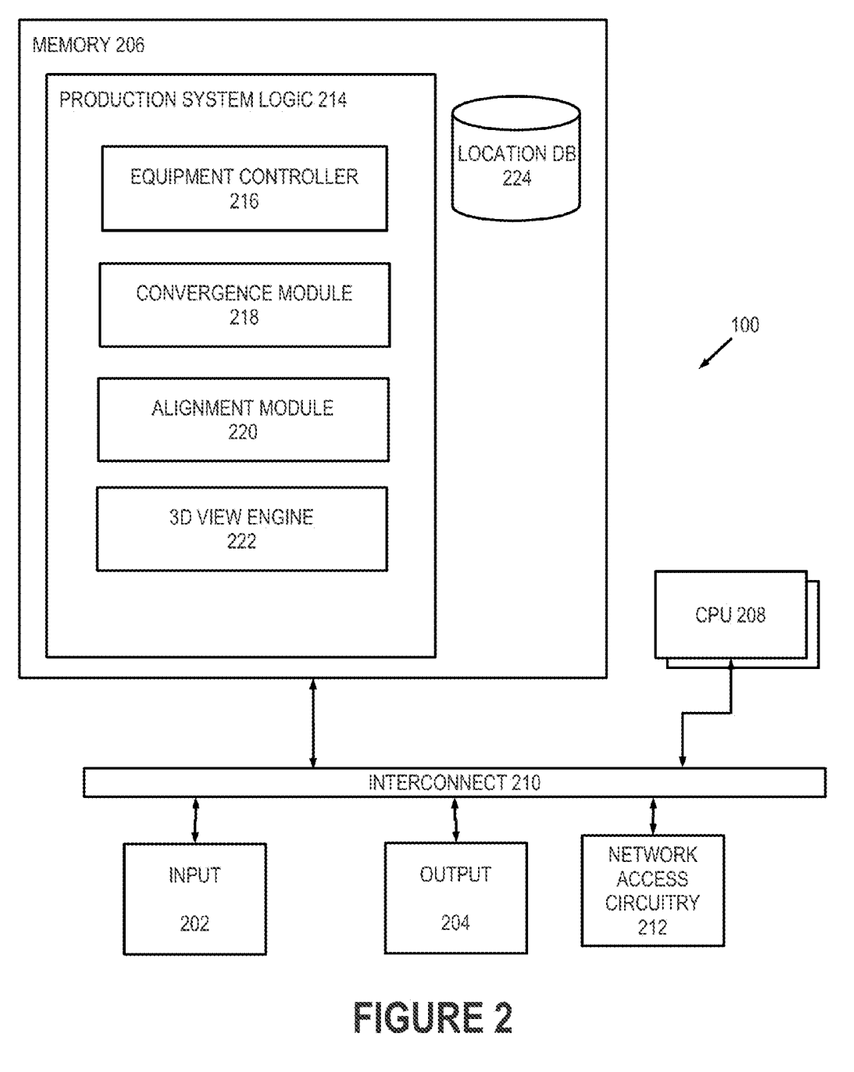
FIG. 2 is a block diagram of the elements of the video production system of FIG. 1 in greater detail.

Some elements of video production system 100 are shown diagrammatically in FIG. 2. Video production system 100 includes one or more microprocessors 208 (collectively referred to as CPU 208) that retrieve data and/or instructions from memory 206 and execute retrieved instructions in a conventional manner. Memory 206 can include persistent memory such as magnetic and/or optical disks, ROM, and PROM and volatile memory such as RAM.

CPU 208 and memory 206 are connected to one another through a conventional interconnect 210, which is a bus in this illustrative embodiment and which connects CPU 208 and memory 206 to one or more input devices 202 and/or output devices 204 and network access circuitry 212. Input devices 202 can include, for example, a keyboard, a keypad, a touch-sensitive screen, a mouse, and a microphone. Output devices 204 can include a display—such as a liquid crystal display (LCD)—and one or more loudspeakers. Network access circuitry 212 sends and receives data through network 102. In this illustrative embodiment, network access circuitry 212 can send data to and receive data from one or more wireless tracking stations of venue 104 and communications devices associated with cameras 110A-D and microphones 112A-B.

A number of components of video production system 100 are stored in memory 206. In particular, equipment controller 216, convergence module 218, alignment module 220, and 3D view engine 222 are each all or part of one or more computer processes executing within CPU 208 from memory 206 in this illustrative embodiment but can also be implemented, in whole or in part, using digital logic circuitry. As used herein, "logic" refers to (i) logic implemented as computer instructions and/or data within one or more computer processes and/or (ii) logic implemented in electronic circuitry. Location database 224 represents locations of all tagged elements in venue 104 in data stored in memory 206. In this illustrative embodiment, location database 224 is organized as a database. However, it should be appreciated that locations of tagged elements of venue 104 can be represented in other types of data, i.e., not in one or more databases.

Figure 3:
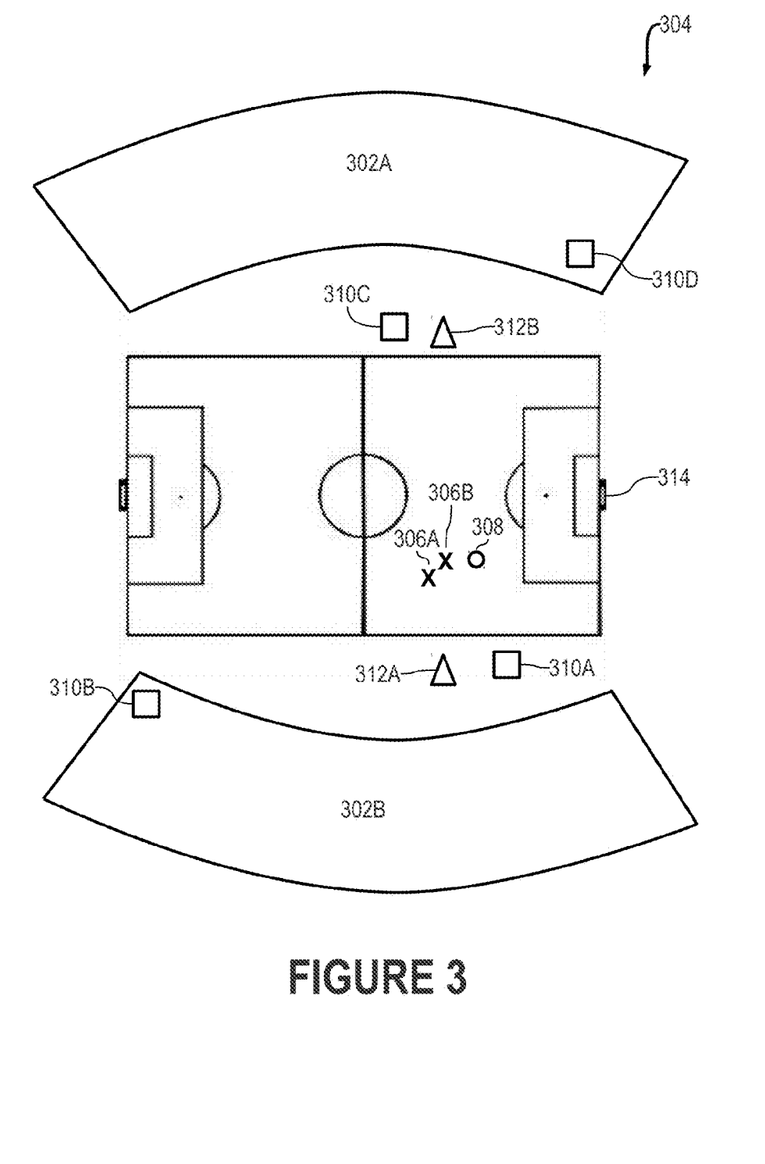
FIG. 3 illustrates a graphical representation of the venue of FIG. 1 and location of elements therein in accordance with the present invention.

FIG. 3 shows a graphical view 304 representing venue 104 (FIG. 1) and elements therein in a graphical user interface of equipment controller 216. Graphical view 304 shows a soccer field 314 and stadium seating sections 302A-B. In addition, equipment controller 216 uses data from location database 224 to represent locations of various elements of venue 104 within graphical view 304. In addition, location database 224 can include locations of predetermined locations within venue 104, such as corners of soccer field 314 and a number of locations within stadium seating sections 302A-B for example, to properly correlate locations of other elements in view 304.

In view 304, equipment controller 216 represents locations of elements of venue 104 in the manner shown in the following table:

| Element of Venue 104 | Representation in Graphical View 304 |
| --- | --- |
| Players 106A-B | X's 306A-B, respectively |
| Soccer ball 108 | Circle 308 |
| Cameras 110A-D | Squares 310A-D, respectively |
| Microphones 112A-B | Triangles 312A-B, respectively |

View 304 provides a clear and intuitive view of locations of cameras and microphones in venue 104 not currently available to video producers. Video production system 100 completely obviates questions such as "where is Camera 4?" Confusion and complexity is sufficiently reduced in video production control rooms.

In addition, equipment controller 216 significantly simplifies the producer's control of locations of respective elements. In particular, equipment controller 216 implements a graphical user interface in which the producer can instruct movement of camera 110A, for example, to a new location by moving corresponding square 310A to a desired location within graphical view 304. In this illustrative embodiment, the producer moves square 310A using a conventional drag-and-drop graphical user interfacing involving physical manipulation of one or more of input devices 202.

Since locations within graphical view 304 correlate to locations within venue 104, equipment controller 216 determines a location within venue 104 that corresponds to the end location of square 310A as dragged by the producer.

Equipment controller 216 sends a command to camera 110A to move to the corresponding location within venue 104. If camera 110A is robotically controlled, equipment controller 216 sends commands through network 102 to robotic control logic of camera 110A to cause camera 110A to move to the new location. If camera 110A is manually controlled, equipment controller 216 sends instructions to the human operator of camera 110A to move to the new location. The commands can be verbal—using text-to-speech logic, for example—over an audio communications channel or, for better accuracy, can be communicated to a GUI mapped location/navigation device in the possession of the camera operator. Any typical communications computing device with graphical navigation mapping software can serve as such a device, though it's best if the navigation software uses the same location determination produced by the wireless tracking device of camera 110A.

Equipment controller 216 shows the new location of square 310A in a distinguished form, such as greyed and/or dashed. As camera 110A is moved in compliance with the movement command sent by equipment controller 216, the location of square 310A is updated to provide continuous feedback to the produce of compliance with the movement instruction.

As a result, the producer can easily and conveniently direct movement of cameras and microphones in response to action in venue 104. In particular, graphical view 304 includes real-time representation of respective locations of players 106A-B and ball 108, allowing the producer to see the flow of the action and to direct movement of cameras 110A-D and microphones 112A-B in accordance therewith.

Other advantages are achieved by knowing the precise locations of other elements of venue 104 along with the orientation of cameras 110A-D. Accordingly, the orientation of cameras 110A-D is monitored and communicated to video production system 100.

In one embodiment, at least two of the same wireless tracking devices that show the position of each camera are also mounted at predetermined locations on the main body of the camera. The two tags on the body of the camera form two points of a virtual sight that indicates a direction in which the camera is pointing. In this embodiment, the wireless tracking system reports the locations of these tags to video production system 100 and video production system 100 determines the orientation of each camera using these locations.

In an alternative embodiment, each of cameras 110A-D includes an inclinometer and an electronic compass mounted on the main camera body to inclination and heading information that video production system 100 combines with the known location of the camera to derive a precise orientation of the camera. In this alternative embodiment, each of cameras 110A-D reports its inclination and heading to video production system 100, e.g., through network 102. In addition, each of cameras 110A-D also report camera settings such as zoom, aperture, etc. to video production system 100.

This additional information of the locations of elements such as ball 108 and of the orientation of a camera pointed at ball 108, e.g., camera 110A, facilitates rapid and efficient identification of ball 108 in the view of camera 110A, i.e., in the video feed received from camera 110A. For example, it is helpful to consider view 404 (FIG. 4) of a video feed from camera 110A. Video production system 100 has information regarding the location of camera 110A, the direction in which camera 110A is pointed, and a magnitude of zoom currently being applied by camera 110A. Accordingly, using routine geometry, video production system 100 estimates a field of view of camera 110A through venue 104.

Figure 4:
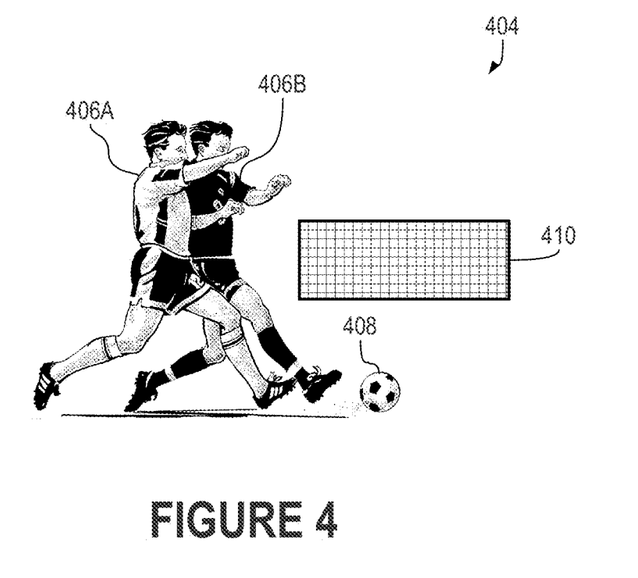
FIG. 4 illustrates a video feed in which elements of the venue of FIG. 1 are positioned.

In addition, video production system 100 has information regarding the location of players 106A-B and ball 108 in three-dimensional space within venue 104. By mapping those locations into the field of view of camera 110A, video production system 100 can estimate with relative accuracy the location of elements such as players 106A-B and ball 108 within view 404. For example, video production system 100 knows approximately where the image 408 of ball 108 should appear within view 404.

Furthermore, video production system 100 follows movement of image 408 from frame to frame in the video feed of camera 110A to more accurately identify that portion of view 404 that is image 408.

Tracking images 406A-B of players 106A-B can be more complex as parts of players 106A-B can move independently of tags that determine their respective locations. For example, arms and legs swing as each player runs. However, arms and legs swing with degrees of freedom that are limited by the specific skeletal joints between the tag and the physical extremity of the player. In other words, the body parts of each player move relative to the tag of the player within recognizable limits, both of distance and type of movement. Accordingly, video product system 100 can follow images 406A-B quite accurately within the video feed of camera 110A.

Convergence module 218 (FIG. 2) uses this knowledge of the precise location of images 406A-B and 408 and the elements they represent (i.e., players 106A-B and ball 108) to stabilize convergence. The depth at which an object is perceived in a 3D display by a human viewer depends upon the angles at which the eyes of the viewer converge the left and right views of the object. The more the eyes point inward so that both eyes can see the object, the closer the object appears. Conversely, the less the eyes point inward to see the object, the further the object appears.

View 404 is a single view. However, at least two views are required for stereoscopic vision. Accordingly, a 3D view from camera 110A would require at least two views. Camera 110A can be a pair of cameras mounted side-by-side to provide a right and left pair of video feeds. Camera 110A can also be a single stereoscopic camera using a beam splitter to generate two views displaced horizontally from one another. Or, as described more completely below, video production system 100 can synthesize a pair of views from a single video feed received from camera 110A. In any case, image 408 will appear in different locations in the respective views to provide the illusion of ball 108 displaced from the surface of a video display, such as a 3D TV, for example.

Convergence module 218 stabilizes convergence by stabilizing horizontal offsets of corresponding images in the right and left views of a stereoscopic video feed.

First, convergence module 218 identifies a central element whose projected depth is to be stabilized. Convergence module 218 can automatically select the central element according to predetermined rules. For example, convergence module 218 can be configured to use the player closest to the camera or the ball as the central element. In addition, convergence module 218 can receive data through a graphical user interface whereby the director manually selects the central element, e.g., by selecting an element in graphical view 304 to thereby generate signals identifying an intended central element. In addition, convergence module 218 can select multiple elements as defining the central element, which is then the spatial center of the selected multiple elements. In this illustrative embodiment, the central element is ball 108, represented by image 408.

Next, convergence module 218 selects a depth at which the central element should be perceived by the viewer. There are a number of ways in which the depth can be selected. In one embodiment, the depth is fixed and predetermined, e.g., in the plane of the stereoscopic display screen or one foot in front of the screen. In an alternative embodiment, the depth is calculated from image 408. For example, convergence module 218 strives to match the depth to the prominence of the central element in view 404. For example, if image 408 of ball 108 fills nearly the entirety of view 404, convergence module 218 selects a depth at or near as close to the viewer as possible. Conversely, if image 408 occupies only a few pixels, convergence module 218 selects a depth at or near as far from the viewer as possible. The advantage of this approach can be appreciated by considering a video feed in which ball 108 is kicked directly at camera 110A. Holding the perceived depth of image 408 steady would result in the remainder of view 404 appearing to fly away from the viewer at a very high rate of speed. However, the more proportional approach described here provides the more proper perspective of ball 108 flying at the viewer.

At this point, convergence module 218 has identified a location in venue 104 and a depth at which that location should be projected. In addition, convergence module 218 knows which images (e.g., image 408) in view 404 represent the central element. Convergence module 218 determines a horizontal offset between image 408 in the two views of the stereoscopic frame that would result in the selected depth at which image 408 should be projected. Lastly, convergence module 218 shifts either or both of the right and left views such that the proper horizontal offset between the left and right instances of image 408 is achieved.

Such fully automates and properly regulates convergence in the stereoscopic video feed from camera 110A.

Alignment module 220 (FIG. 2) uses similar information to vertically align corresponding left and right views of a stereoscopic video feed. Alignment module 220 identifies corresponding images in the left and right views, such as image 408 of ball 108 in both the left and right views corresponding to view 408. Alignment module 220 then matches the left and right versions of image 408 to identify vertical displacement of the left and right versions of image 408 and shifts one or both of the left and right views to negate any such vertical displacement.

Such fully automates and properly maintains vertical alignment between left and right views of a stereoscopic video feed.

3D view engine 222 of video production system 100 synthesizes views of the event of venue 104 in two ways. First, 3D view engine 222 synthesizes a 3D scene from a 2D shot. Second, 3D view engine 222 synthesizes a scene viewed from a position at which no camera was located.

3D view engine 222 synthesizes 3D scenes from a 2D shot by knowing the respective 3D locations of elements in the 2D shot in the manner described above with respect to convergence module 218 and alignment module 220. In particular, 3D view engine 222 knows the distance from the camera, e.g., camera 110A, at which images 406A-B, 408, and 410 are located. In this illustrative example, images 406A-B and 408 representing players 106A-B and ball 108 are at different, albeit similar, distances from camera 110A. In contrast, image 410, representing a soccer goal, is at a significantly greater distance from camera 110A.

3D scenes require at least two views. However, 3D view engine 222 processes a single view. In an alternative embodiment, 3D view engine 222 processes two views of a stereoscopic camera and produces additional views for a stereoscopic display that requires more than two views.

In this illustrative embodiment, 3D view engine 222 uses the single scene received from a 2D camera as the right-eye view and synthesizes a left-eye view therefrom. In alternative embodiments, 3D view engine 222 can use the single scene as the left-eye and synthesize the right-eye view or can treat the single scene as a view midway between left- and right-eye views synthesized by 3D view engine 222.

In 3D scenes, corresponding left- and right-eye image elements have horizontal offsets corresponding to the projected distance of the elements. Accordingly, 3D view engine 222 shifts images 406A-B, 408 and 410 in the synthesized left-eye view horizontally by distances corresponding to the relative distances of the represented elements from the camera. For example, since the soccer goal represented by image 410 is further from camera 110A, so 3D view engine 222 shifts image 410 in the synthesized left-eye view than 3D view engine 222 shifts images 406A-B and 408.

As described above, video production system 100 tracks images 406A-B and 408 from frame to frame. Video production system 100 also tracks image 410 and background behind those images. In synthesizing the left-eye view, shifting by 3D view engine 222 of images 406A-B, 408, and 410 as described above covers other elements of view 404 and exposes other elements or regions of view 404.

In covering other elements of view 404, 3D view engine 222 writes the nearer shifted image over the further image. For example, to the extent the shifting of image 406A covers portions of view representing more distant elements, 3D view engine 222 draws image 406A over those portions.

In exposing other elements of view 404, 3D view engine 222 uses stored images of those elements saved from previous frames to show those exposed elements that are missing from the single shot processed by 3D view engine 222. For example, if synthesizing the left-eye view causes 3D view engine 222 to shift image 406A to expose a portion of image 406B that is not available in view 404, 3D view engine 222 uses a portion of image 406B preserved from previous frames of scene 404. In particular, as 3D view engine 222 tracks images 406A-B, 408, 410, and the background of view 404, 3D view engine 222 preserves obscured portions of those images, using image manipulation techniques, such as stretching, rotation, interpolation, motion detection, etc., to estimate the obscured portions.

As the elements of view 404 are horizontally shifted between two views produced by 3D view engine 222, 3D view engine 222 synthesizes a stereoscopic scene from a 2D shot. Using similar techniques, 3D view engine 222 synthesizes additional views for stereoscopic displays requiring more than two views.

3D view engine 222 synthesizes views from locations at which no camera is positioned using locations of all elements in a scene and data representing the appearance of all such elements.

In this illustrative embodiment, 3D view engine 222 includes data representing 3D models of all elements expected to be shown in venue 104. Such 3D models can be made in the same manner that they are made in 3D computer games, particularly sports-themed games in which the modeled players are designed to resemble actual human players. One such computer video game is the FIFA Soccer 11 game currently available from Electronic Arts of Mountain View, Calif.

While one, two, or three wireless tracking devices might be sufficient to give full position and orientation information of some elements in the subject venue, e.g., ball 108 or cars in a race such as Formula One or NASCAR, it is preferred that human players such as players 106A-B are tagged in more locations. For example, players 106A-B are tagged at the head, shoulders, elbows, wrists, hips, knees, and ankles. In early embodiments, such wireless tracking devices might have enough size and weight to be noticeable to the players and might work best in sports in which the players are already heavily laden with armor, such as football and hockey.

3D view engine 222 uses such location information regarding the players, including the orientation of every limb of each player, and location information and image information regarding the environment of the players, such as the field, the goal, the ball, etc. to produce fully synthesized views in generally the manner computer video games do. In addition, 3D view engine 222 uses the same technique to produce additional views from slight horizontal offsets to produce a number of corresponding views for stereoscopic vision.

Unlike conventional video games, 3D view engine 222 derives the views from real-time location information of a live event happening within venue 104. There are a number of advantages realized by 3D view engine 222.

One advantage is the ability to show scenes that cannot be captured by a camera. For example, if venue is equipped for 3D coverage, there might be fewer cameras than would typically be used for 2D coverage. Yet, until 3D TVs become ubiquitous, most video productions will be available in both 3D and 2D. Thus, 3D view engine 222 allows a 2D presentation, which typically has more camera views and cuts to different views more often than does 3D presentation, to include views at which a camera might not have been positioned, i.e., to simulate additional cameras within venue 104.

Other examples can provide a much more dramatic viewing experience for the audience. 3D view engine 222 can synthesize a scene as if a camera was placed in the position of a goalie's head, watching player's 106A-B and ball 108 quickly approaching range for a shot on goal. 3D view engine 222 enables "instant replay" options inconceivable with conventional video production techniques. For example, in a football game, a single play can be immediately replayed from the viewing perspective of various player positions involved in the play—a view of the quarterback standing in the pocket and watching the routes of the receivers, a view of a defensive player rushing the quarterback, a view of the defender covering the receiver, and a view of the receiver catching the ball. In fact, 3D view engine 222 can present a view of the play from any player's perspective, or any perspective within venue 104, and can do so in real-time (i.e., to be included in the video presentation produced by video production system 100 synchronously with live-video feed portions of the video presentation) or in immediate replays of live action.

In addition to fully synthesized views, 3D view engine 222 can use the same models of players and the environment of venue 104 to synthesize additional views of a live video feed to provide stereoscopic presentation of the event of venue 104. In particular, 3D view engine 222 can use the models to facilitate more accurately synthesize exposed portions of otherwise obscured elements of a view in corresponding synthetic views.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for controlling convergence in two or more views of at least one object during creation of a stereoscopic image, the method comprising:

creating the stereoscopic image by:
receiving two or more views each comprising an image of at least one object, wherein the two or more views are each captured from a different perspective within an area;
identifying a location of a predetermined object in each of the two or more views, wherein the identifying comprises identifying that the predetermined object is located in different locations within each of the two or more views and wherein the identifying comprises receiving tagging information from the predetermined object identifying the location of the predetermined object within the area and, based upon the location of the predetermined object within the area, estimating the location of the predetermined object within the two or more views;
determining a perceived depth at which the predetermined object should be perceived;
determining a relative horizontal offset of the location of the predetermined object in each of the two or more views that provides the perceived depth during stereoscopic viewing of the stereoscopic image, wherein the determining comprises using the location of the predetermined object in each of the two or more views to determine the relative horizontal offset;
shifting one or more of the views to a different horizontal perspective with respect to another of the two or more views such that the location of the predetermined object is at the relative horizontal offset within the two or more views; and
thereafter, creating the autostereoscopic image by combining the shifted one or more of the views with the another of the two or more views.

2. The method of claim 1, wherein the identifying the location of the predetermined object further comprises:
determining a location of the predetermined object in a physical space relative to a location of at least two cameras capturing the two or more views of the stereoscopic image;
wherein identifying the location of the predetermined object in each of the two or more views comprises comparing the location of the predetermined object in the physical space to the location and orientation of the at least two cameras in the physical space to estimate a location within the two or more views that the predetermined object should appear.

3. A method for controlling vertical alignment in two or more views of at least one object during creation of a stereoscopic image, the method comprising:
creating the stereoscopic image by:
receiving two or more views each comprising an image of at least one object, wherein the two or more views are each captured from a different perspective within an area;
identifying a location of a predetermined object in each of the two or more views, wherein the identifying comprises identifying that the predetermined object is located in different locations within each of the two or more views and wherein the identifying comprises receiving tagging information from the predetermined object identifying the location of the predetermined object within the area and, based upon the location of the predetermined object within the area, estimating the location of the predetermined object within the two or more views;
determining a relative vertical perspective offset of the location of the predetermined object in each of the two or more views, wherein the determining comprises using the location of the predetermined object in each of the two or more views to determine the relative vertical perspective offset;
shifting one or more of the views vertically with respect to another of the two or more views such that the location of the predetermined object is at the same vertical offset within the two or more views, wherein the shifting comprises identifying at least one portion of the one or more views that was obscured before shifting the one or more views and accessing at least one previously captured image to synthesize the at least one portion of the one or more views that is unobscured due to the shifting; and
thereafter, creating the autostereoscopic image by combining the shifted one or more of the views with the another of the two or more views.

4. The method of claim 3, wherein the identifying the location of the predetermined object further comprises:
determining a location of the predetermined object in a physical space relative to a location of at least two cameras capturing the two or more views of the stereoscopic image;
wherein identifying the location of the object in each of the two or more views comprises comparing the location of the predetermined object in the physical space to the location and orientation of the at least two cameras in the physical space to estimate a location within the two views that the predetermined object should appear.

5. A method for producing one or more additional views for a stereoscopic image, the method comprising:
receiving at least two images each comprising an image of at least one object, wherein the two or more images are each captured from a unique image capture device and wherein the at least two images are captured from a different perspective within an area;
identifying a location of a predetermined object in each of the at least two images, wherein the identifying comprises identifying that the predetermined object is located in different locations within each of the at least two images and wherein the identifying comprises receiving tagging information from the predetermined object identifying the location of the predetermined object within the area and, based upon the location of the predetermined object within the area, estimating the location of the predetermined object within the two or more views;
determining a depth at which the predetermined object should be perceived;
determining a relative horizontal offset of the location of the predetermined object for each of the images that provides the perceived depth during stereoscopic viewing of the stereoscopic image, wherein the determining comprises using the location of the predetermined object in each of the two or more images to determine the relative horizontal offset; and
producing the one or more additional views by horizontally shifting, by the determined horizontal offset, a portion of the at least one received image that represents the predetermined object and storing the at least one received image with the horizontally shifted portion as one of the additional views, wherein the shifting comprises identifying at least one portion of the at least one received image that was obscured before shifting the at least one received image and accessing at least one previously captured image to synthesize the at least one portion of the at least one image that is unobscured due to the shifting.

6. The method of claim 5 further comprising:
repeating the steps of identifying the location, determining a depth, determining a relative horizontal offset, and horizontally shifting for each of one or more additional objects.

7. The method of claim 5, wherein the identifying the location of the predetermined object further comprises:
determining a location of the predetermined object in a physical space relative to a location of a cameras from which the captured view is received;
wherein identifying the location of the predetermined object in the at least one received image comprises comparing the location of the predetermined object in the physical space to the location and orientation of the camera in the physical space to estimate a location within the received image that the predetermined object should appear.

8. A non-transitory computer readable medium useful in association with a computer which includes one or more processors and a memory, the non-transitory computer readable medium including computer instructions which are configured to cause the computer, by execution of the computer instructions in the one or more processors from the memory, to control convergence in two or more views of at least one object during creation of a stereoscopic image, by at least:
creating the stereoscopic image by:
receiving two or more views each comprising an image of at least one object, wherein the two or more views are each captured from a different perspective within an area;
identifying a location of a predetermined object in each of the two or more views, wherein the identifying comprises identifying that the predetermined object is located in different locations within each of the two or more views and wherein the identifying comprises receiving tagging information from the predetermined object identifying the location of the predetermined object within the area and, based upon the location of the predetermined object within the area, estimating the location of the predetermined object within the two or more views;
determining a perceived depth at which the predetermined object should be perceived;
determining a relative horizontal offset of the location of the predetermined object in each of the two or more views that provides the perceived depth during stereoscopic viewing of the stereoscopic image, wherein the determining comprises using the location of the predetermined object in each of the two or more views to determine the relative horizontal offset;
shifting one or more of the views to a different horizontal perspective with respect to another of the two or more views such that the location of the predetermined object is at the relative horizontal offset within the two or more views, wherein the shifting comprises identifying at least one portion of the one or more views that was obscured before shifting the one or more views and accessing at least one previously captured image to synthesize the at least one portion of the one or more views that is unobscured due to the shifting; and
thereafter, creating the autostereoscopic image by combining the shifted one or more of the views with the another of the two or more views.

9. The non-transitory computer readable medium of claim 8 wherein the identifying the location of the predetermined object comprises:
determining a location of the predetermined object in a physical space relative to a location of at least two cameras capturing the two or more views of the stereoscopic image;
wherein identifying the location of the predetermined object in each of the two or more views comprises comparing the location of the predetermined object in the physical space to the location and orientation of the at least two cameras in the physical space to estimate a location within the two or more views that the predetermined object should appear.

10. A non-transitory computer readable medium useful in association with a computer which includes one or more processors and a memory, the non-transitory computer readable medium including computer instructions which are configured to cause the computer, by execution of the computer instructions in the one or more processors from the memory, to control vertical alignment in two or more views of at least one object during creation of a stereoscopic image, by at least:
creating the stereoscopic image by:
receiving two or more views each comprising an image of at least one object, wherein the two or more views are each captured from a different perspective within an area;
identifying a location of a predetermined object in each of the two or more views, wherein the identifying comprises identifying that the predetermined object is located in different locations within each of the two or more views and wherein the identifying comprises receiving tagging information from the predetermined object identifying the location of the predetermined object within the area and, based upon the location of the predetermined object within the area, estimating the location of the predetermined object within the two or more views;
determining a relative vertical perspective offset of the location of the predetermined object in each of the two or more views, wherein the determining comprises using the location of the predetermined object in each of the two or more views to determine the relative vertical perspective offset;
shifting one or more of the views vertically with respect to another of the two or more views such that the location of the predetermined object is at the same vertical offset within the two or more views, wherein the shifting comprises identifying at least one portion of the one or more views that was obscured before shifting the one or more views and accessing at least one previously captured image to synthesize the at least one portion of the one or more views that is unobscured due to the shifting; and
thereafter, creating the autostereoscopic image by combining the shifted one or more of the views with the another of the two or more views.

11. The non-transitory computer readable medium of claim 10 wherein the identifying the location of the predetermined object comprises:
determining a location of the predetermined object in a physical space relative to a location of at least two cameras capturing the two or more views of the stereoscopic image;
wherein identifying the location of the predetermined object in each of the two or more views comprises comparing the location of the predetermined object in the physical space to the location and orientation of the at least two cameras in the physical space to estimate a location within the two or more views that the predetermined object should appear.

12. A non-transitory computer readable medium useful in association with a computer which includes one or more processors and a memory, the non-transitory computer readable medium including computer instructions which are configured to cause the computer, by execution of the computer instructions in the one or more processors from the memory, to produce one or more additional views for a stereoscopic image, by at least:

receiving at least two images each comprising an image of at least one object, wherein the two or more images are each captured from a unique image capture device and wherein the at least two images are captured from a different perspective within an area;

identifying a location of a predetermined object in each of the at least two images, wherein the identifying comprises identifying that the predetermined object is located in different locations within each of the at least two images and wherein the identifying comprises receiving tagging information from the predetermined object identifying the location of the predetermined object within the area and, based upon the location of the predetermined object within the area, estimating the location of the predetermined object within the two or more views;

determining a depth at which the predetermined object should be perceived;

determining a relative horizontal offset of the location of the predetermined object for each of the images that provides the perceived depth during stereoscopic viewing of the stereoscopic image, wherein the determining comprises using the location of the predetermined object in each of the two or more images to determine the relative horizontal offset; and producing the one or more additional views by horizontally shifting, by the determined horizontal offset a portion of the at least one received image that represents the predetermined object and storing the at least one received image with the horizontally shifted portion as one of the additional views, wherein the shifting comprises identifying at least one portion of the at least one received image that was obscured before shifting the at least one received image and accessing at least one previously captured image to synthesize the at least one portion of the at least one image that is unobscured due to the shifting.

13. The non-transitory computer readable medium of claim 12 wherein the computer instructions are configured to cause the computer to produce one or more additional views for a stereoscopic image by also:

repeating the steps of identifying the location, determining a depth, determining a relative horizontal offset, and horizontally shifting for each of one or more additional objects.

14. The non-transitory computer readable medium of claim 12 wherein the identifying the location of the predetermined object comprises:

determining a location of the predetermined object in a physical space relative to a location of a cameras from which the received image is received;

wherein identifying the location of the predetermined object in the captured view comprises comparing the location of the predetermined object in the physical space to the location and orientation of the camera in the physical space to estimate a location within the received image that the predetermined object should appear.

15. A computer system comprising:
a processor;
a non-transitory computer readable medium operatively coupled to the processor; and
a convergence module (i) that executes in the processor from the non-transitory computer readable medium and (ii) that, when executed by the processor, causes the computer to control convergence in two or more views of at least one object during creation of a stereoscopic image, by at least:

creating the stereoscopic image by:
receiving two or more views each comprising an image of at least one object, wherein the two or more views are each captured from a different perspective within an area;

identifying a location of a predetermined object in each of the two or more views, wherein the identifying comprises identifying that the predetermined object is located in different locations within each of the two or more views and wherein the identifying comprises receiving tagging information from the predetermined object identifying the location of the predetermined object within the area and, based upon the location of the predetermined object within the area estimating the location of the predetermined object within the two or more views;

determining a perceived depth at which the predetermined object should be perceived;

determining a relative horizontal offset of the location of the predetermined object in each of the two or more views that provides the perceived depth during stereoscopic viewing of the stereoscopic image, wherein the determining comprises using the location of the predetermined object in each of the two or more views to determine the relative horizontal offset;

shifting one or more of the views to a different horizontal perspective with respect to another of the two or more views such that the location of the predetermined object is at the relative horizontal offset within the two or more views, wherein the shifting comprises identifying at least one portion of the one or more views that was obscured before shifting the one or more views and accessing at least one previously captured image to synthesize the at least one portion of the one or more views that is unobscured due to the shifting; and thereafter, creating the autostereoscopic image by combining the shifted one or more of the views with the another of the two or more views.

16. The computer system of claim 15 wherein the identifying the location of the predetermined object comprises:

determining a location of the predetermined object in a physical space relative to a location of at least two cameras capturing the two or more views of a stereoscopic image;

wherein identifying the location of the predetermined object in each of the more than two views comprises comparing the location of the predetermined object in the physical space to the location and orientation of the at least two cameras in the physical space to estimate a location within the two or more views that the predetermined object should appear.

17. A computer system comprising:
a processor;

a non-transitory computer readable medium operatively coupled to the processor; and a 3D view module (i) that executes in the processor from the computer readable medium and (ii) that, when executed by the processor, causes the computer to produce one or more additional views for a stereoscopic image, by at least:

receiving at least two images each comprising an image of at least one object, wherein the two or more images are each captured from a unique image capture device and wherein the at least two images are captured from a different perspective within an area;

identifying a location of a predetermined object in each of the at least two images, wherein the identifying comprises identifying that the predetermined object is located in different locations within each of the at least two images and wherein the identifying comprises receiving tagging information from the predetermined object identifying the location of the predetermined object within the area and, based upon the location of the predetermined object within the area, estimating the location of the predetermined object within the two or more views;

determining a depth at which the predetermined object should be perceived;

determining a relative horizontal offset of the location of the predetermined object for each of the images that provides the perceived depth during stereoscopic viewing of the stereoscopic image, wherein the determining comprises using the location of the predetermined object in each of the two or more images to determine the relative horizontal offset; and producing the one or more additional views by horizontally shifting, by the determined horizontal offset a portion of the at least one received image that represents the predetermined object and storing the at least one received image with the horizontally shifted as one of the additional views, wherein the shifting comprises identifying at least one portion of the at least one received image that was obscured before shifting the at least one received image and accessing at least one previously captured image to synthesize the at least one portion of the at least one image that is unobscured due to the shifting.

18. The computer system of claim 17 wherein the 3D view module, when executed by the processor, causes the computer to produce one or more additional views for a stereoscopic image by also:

repeating the steps of identifying the location, determining a depth, determining a relative horizontal offset, and horizontally shifting for each of one or more additional objects.

19. The computer system of claim 17 wherein the identifying the location of the predetermined object comprises:

determining a location of the predetermined object in a physical space relative to a location of a cameras from which the received image is received;

wherein identifying the location of the predetermined object in the captured view comprises comparing the location of the object in the physical space to the location and orientation of the camera in the physical space to estimate a location within the received image that the predetermined object should appear.

* * * * *